United States Patent Office 3,440,221
Patented Apr. 22, 1969

3,440,221
REGULAR SEQUENTIAL COPOLYESTERS
Richard Keith Quisenberry, Kinston, N.C., assignor to E. I. du Pont de Nemours and Company, Wilmington, Del., a corporation of Delaware
No Drawing. Filed Mar. 4, 1966, Ser. No. 531,731
Int. Cl. C08g 17/08
U.S. Cl. 260—75                                              4 Claims

ABSTRACT OF THE DISCLOSURE

A fiber-forming linear copolyester having a regular sequential molecular structure of recurring units represented by the formula

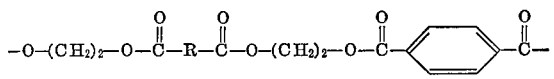

wherein R is a radical of a sterically hindered aromatic dicarboxylic having the carboxyl groups in non-adjacent positions on the aromatic nucleus.

---

This invention relates to linear polyesters and, more particularly, to fiber-forming linear copolyesters having a regular sequential molecular structure.

Methods of preparation and useful properties of polyesters prepared from glycols and dicarboxylic acids are well known. For example, fibers and films prepared from polyethylene terephthalate, as described in Whinfield et al. U.S. Patent No. 2,465,319, dated Mar. 22, 1949, have become standard articles of commerce. It is also known that major changes in polymer properties may be obtained by preparing the polyester from a mixture of two different acids or from a mixture of two different glycols. However, when copolyesters of this type are prepared by usual methods, random copolymers result which have sharply reduced melting points and are difficult to crystallize.

The present invention provides a novel class of copolyesters prepared from a glycol and two different dicarboxylic acids wherein the molecular structure consists of regular sequential units of the following type:

[—glycol—acid$_1$—glycol—acid$_2$—]

These polymers are considerably easier to crystallize and have a much higher melting point than the corresponding random copolymers.

The novel copolyesters of the invention are derived from a glycol of the class HO(CH$_2$)$_x$OH, where $x$ is 2–10, and two different carboxylic acids, with one of the acids being characterized by a high degree of steric hindrance in that part of the molecule adjacent to the carboxylic group. Preferably, the sterically hindered acid is an aromatic dicarboxylic acid having bulky substituents on ring carbon atoms ortho to the carboxylic groups. Examples of suitable sterically hindered acids include 2,3,5,6-tetramethylterephthalic acid, 2,4,6 - trimethylisophthalic acid, 2,3,5,6-tetrachloroterephthalic acid, 2,4,6-trichloroisophthalic acid, 1,2,3,4,5,6,7,8-octahydroanthracence dicarboxylic acid-9,10, and 1,3,5,7-tetramethylnaphthalene dicarboxylic acid-2,6. These are aromatic dicarboxylic acids having the carboxyl groups in non-adjacent positions on an aromatic nucleus with alkyl- or chloro-substituents ortho to the carboxyl groups.

In a preferred embodiment of the invention the copolyester is prepared from terephthalic acid, ethylene glycol, and a sterically hindered dicarboxylic acid, and may be represented as comprising regularly recurring units of the formula

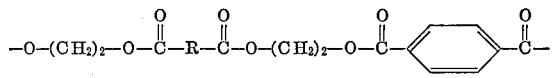

wherein R is a divalent radical from the group consisting of

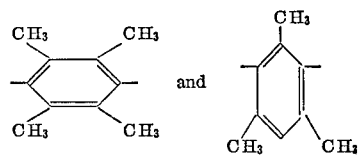

The radicals R are derived from 2,3,5,6 - tetramethylterephthalic acid and 2,4,6-trimethylisophthalic acid. Usually it is preferred that the linear copolyester have an intrinsic viscosity of at least 0.35, as measured in solution at 25° C. in a mixture of 3 parts trifluoroacetic acid and 1 part methylene chloride by weight.

The copolyesters of the invention may be prepared by first forming the bis-glycol ester of the sterically hindered dicarboxylic acid and then carrying out, at an elevated temperature, an ester-interchange condensation reaction between this bis-glycol ester and a lower-alkyl di-ester of terephthalic acid. Surprisingly, the ester linkage adjacent to the sterically hindered acid residue in the bis-glycol ester is sufficiently stable to remain inert in a reaction of this type. Consequently, the copolymer produced contains the two acid groups in a 1:1 ratio and in regular alternating sequence. This reaction may be illustrated as follows for the preparation of poly(ethylene 2,3,5,6-tetramethylterephthalate/ethylene terephthalate):

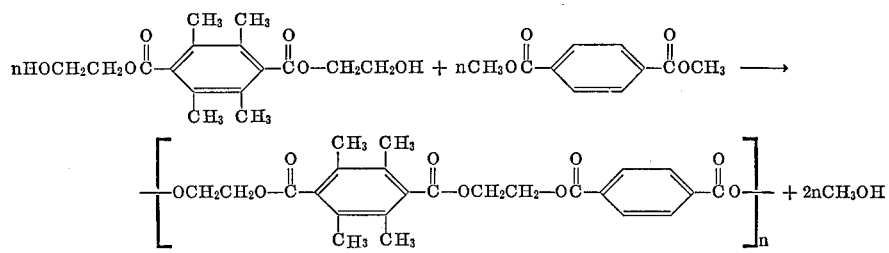

wherein $n$ is a large integer.

The above reaction is usually carried out in the presence of a catalyst. Suitable catalysts include tetrabutyl titanate, manganous acetate and antimony oxide, calcium acetate, and lead oxide.

The bis-glycol ester of the sterically hindered acid used in the above reaction may be prepared by reacting the sodium salt of the acid with 2-chloroethanol. Alternatively the bis-glycol ester may be prepared by reacting the diacid chloride of the sterically hindered acid with an excess of ethylene glycol.

The novel copolyesters of this invention are well suited to a variety of applications. Then can be readily melt spun into filaments or cast from solutions to form self-supporting films. Their properties make them particularly advantageous for use in synthetic fibers for conversion to textiles, films, tapes and other shaped articles obtained by using the polyesters as molding compositions.

The expression "polymer melt temperature" employed with respect to the products of this invention is the minimum temperature at which a sample of the polymer leaves a wet molten trail as it is stroked with moderate pressure across a smooth surface of a heated metal bar. "Polmer melt temperature" has sometimes in the past been referred to as "polymer stick temperature."

The term "intrinsic viscosity," as used herein, is defined as the limit of the fraction $ln(r)/c$ as $c$ approaches 0, where $(r)$ is the relative viscosity, and $c$ is the concentration in grams per 100 ml. of solution. The relative viscosity $(r)$ is the ratio of the viscosity of a solution of the polymer, in a mixture of 3 parts trifluoroacetic acid and one part methylene chloride by weight, to the viscosity of the trifluoroacetic acid/methylene chloride mixture, per se, measured in the same units at 25° C. Intrinsic viscosity is a measure of the degree of polymerization.

This invention is further illustrated, but is not intended to be limited, by the following examples in which parts and percentages are by weight, unless otherwise specified.

EXAMPLE I

A standard polymer tube is charged with bis[2-hydroxyethyl] - 2,3,5,6 - tetramethylterephthalate (25.0 g., 0.081 mol), dimethylterephthalate (6.8 g., 0.035 mol), and tetrabutyl titanate (0.080 g. in 1.6 ml. n-butanol). The tube is heated at 170–220° C. for three hours during which time 3.2 ml. of methanol is removed by distillation. The temperature of the tube is then raised to 275–280° C. for 4.75 hours, with the pressure being reduced to 0.3 mm. Hg. During this period excess bis[2-hydroxyethyl] - 2,3,5,6 - tetramethylterephthalate is removed through the vacuum system. Upon cooling the tube, a crystalline polymer is formed which is found to have a PMT of 269° C. and an intrinsic viscosity of 0.69. The polymer exhibits a distinctive X-ray diffraction pattern confirming its crystallinity. The polymer is insoluble in chlorinated hydrocarbons and ketones.

Degradation of the polymer and analysis of the products by gas chromatography confirms that the two acids are present in a 1:1 mol ratio.

The copolyester is melt spun at 300° C. and the fiber produced is drawn 3.5× at 150° C. After a mock finishing treatment the fiber is tested for recovery properties and found to give a TSR value of 65. Dyeability tests with dispersed dyes indicates that the dyeability of the fiber is substantially equivalent to that of a fiber spun from polyethylene terephthalate in similar fashion.

The mock finishing procedure used above comprises the consecutive steps of: (a) heat-treating the filaments by boiling them in water for 15 minutes while allowing 3% shrinkage in length, (b) heating the filaments in an oven at 180° C. for three minutes, again allowing 3% shrinkage in length, (c) heat-treating the filaments by boiling them in water for 15 minutes while allowing 1% shrinkage in length, and finally (d) air drying the filaments.

The TSR of a yarn sample is determined by mounting a 10-inch length of the yarn on a tensile tester (commercially available from the Instron Engineering Corporation, Quincy, Mass.). The sample is then immersed in a water bath maintained at 40° C. for a period of 2 minutes and then stretched, in the water bath, at an elongation rate of 1 inch (2.54 cm.) per minute. Upon reaching the desired total elongation, the sample is held at constant length for an additional 2 minutes and the water bath is removed. The load on the yarn is then reduced to a value of 0.042 g.p.d. and the yarn is allowed to retract. Percent recovery is calculated from the formula:

$$\frac{\text{units of retraction}}{\text{units of elongation}} \times 100$$

This procedure is carried out for elongations of 0.5, 1, 2 and 3%, and a graph is prepared by plotting the percent recovery against total elongation in the range 0–3%. TSR values are average percent recovery values from the range 0–3% elongation which may be determined from the graph by usual graphical averaging procedures. Yarns having TSR values of 60% are considered to have good tensile recovery.

For comparison it is interesting to note that a random copolymer having an intrinsic viscosity of 0.65 prepared by another route, in which the ratio of tetramethylterephthalate units to terephthalate units is 48:52, has a PMT of only 160° C. and cannot be made to crystallize.

EXAMPLE II

The polymer preparation procedure of Example I is repeated using bis[2 - hydroxyethyl] - 2,4,6-trimethylisophthalate in place of bis[2-hydroxyethyl]-2,3,5,6-tetramethylterephthalate. A high-melting crystalline solid is produced which is capable of being melt spun into fibers. By degradation of the polymer and analysis of the products it is confirmed that the ratio of 2,4,6-trimethylisophthalate units to terephthalate units is 1:1.

The following method may be employed to produce bis[2 - hydroxyethyl] - 2,3,5,6 - tetramethylterephthalate from the free acid. The preparation of the acid itself is described in Koenecke et al. U.S. Patent No. 2,806,877 dated Sept. 17, 1957.

Into a 1 liter flask equipped with a heating mantle, stirrer, and reflux condenser is placed 400 ml. water and 14.4 grams (0.36 mol) sodium hydroxide. To this is added 40.0 grams (0.18 mol) 2,3,5,6 - tetramethylterephthalic acid. After the acid is dissolved, 50 grams (0.6 mol) 2-chloroethanol and 0.25 gram sodium iodide are added. The solution is stirred at reflux temperature for 24 hours, and then cooled to give 53 grams of a white solid. After recrystallization from ethylene chloride, the solid is found to melt at 140–141° C. Analysis calculated for $C_{16}H_{22}O_6$: C, 61.9; H, 7.15. Found: C, 61.7; H, 7.12.

Bis[2-hydroxyethyl]-2,4,6-trimethylisophthalate is prepared from 2,4,6-trimethylisophthalic acid in a similar fashion. The preparation of the acid itself is disclosed in Beilstein, Handbuch Der Organischen Chemie, vol. IX (1926), p. 884(19).

Since many different embodiments of the invention may be made without departing from the spirit and scope thereof, it is to be understood that the invention is not limited by the specific illustrations except to the extent defined in the following claims.

I claim:

1. A polymeric fiber-forming linear copolyester having a regular sequential molecular structure consisting essentially of recurring units represented by the formula,

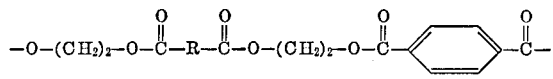

wherein R is a divalent radical from the group consisting of

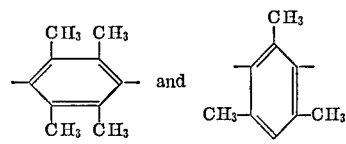

2. A copolyester as defined in claim 1 having an intrinsic viscosity of at least 0.35, as measured in solution at 25° C. in a mixture of 3 parts trifluoracetic acid and 1 part methylene chloride by weight.

3. The copolyester of claim 1 which is poly(ethylene 2,3,5,6-tetramethylterephthalate/ethylene terephthalate) having the tetramethylterephthalate and the terephthalate groups arranged in regular alternating sequence.

4. The copolyester of claim 1 which is poly(ethylene 2,4,6-trimethylisophthalate/ethylene terephthalate) having the trimethylisophthalate and the terephthalate groups arranged in regular alternating sequence.

References Cited

UNITED STATES PATENTS

| 3,341,500 | 9/1967 | Schwarz | 260—75 |
| 3,013,914 | 12/1961 | Willard | 260—75 |
| 3,037,964 | 6/1962 | Bruson et al. | |

FOREIGN PATENTS 1,342,483  9/1963  France.

WILLIAM H. SHORT, *Primary Examiner.*

LOUISE P. QUAST, *Assistant Examiner.*

U.S. Cl. X.R.

8—151.2; 264—290; 260—33.8, 31.2